US007804265B2

(12) United States Patent
Hoermann

(10) Patent No.: US 7,804,265 B2
(45) Date of Patent: Sep. 28, 2010

(54) SENSOR UNIT

(75) Inventor: Michael Hoermann, Halle/Westphalia (DE)

(73) Assignee: Marantec Antriebs- und Steuerungstechnik GmbH & Co. KG, Marienfeld (DE)

( * ) Notice: Subject to any disclaimer, the term of this patent is extended or adjusted under 35 U.S.C. 154(b) by 400 days.

(21) Appl. No.: 11/986,342

(22) Filed: Nov. 20, 2007

(65) Prior Publication Data

US 2008/0119964 A1 May 22, 2008

(30) Foreign Application Priority Data

Nov. 22, 2006 (DE) ........................ 20 2006 017 803

(51) Int. Cl.
*G05B 5/00* (2006.01)

(52) U.S. Cl. ........................ 318/445; 318/466; 318/467

(58) Field of Classification Search ................. 318/445, 318/466, 467, 468; 700/302; 49/31
See application file for complete search history.

(56) References Cited

U.S. PATENT DOCUMENTS

| | | | | |
|---|---|---|---|---|
| 6,171,225 | B1 * | 1/2001 | Nonoyama et al. | 493/16 |
| 7,248,011 | B2 * | 7/2007 | Schachtl et al. | 318/466 |
| 2009/0199484 | A1 * | 8/2009 | Zipp | 49/358 |

FOREIGN PATENT DOCUMENTS

| | | |
|---|---|---|
| CN | 1417445 A | 5/2003 |
| CN | 1811119 A | 8/2006 |

OTHER PUBLICATIONS

Office Action of State Intellectual Property office of People's Republic of China, Application No. 200710166480.9, Issued May 5, 2010, 3 pages.

* cited by examiner

*Primary Examiner*—Karen Masih
(74) *Attorney, Agent, or Firm*—Alleman Hall McCoy Russell & Tuttle LLP

(57) ABSTRACT

The present disclosure relates to a sensor unit for the position determination of a powered door having a position sensor and a transmission stage for the connection of the position sensor to the drive shaft of the door, with the sensor unit having its own housing so that it can be installed independently of the drive unit of the door.

24 Claims, 5 Drawing Sheets

X
1:1

SENSOR UNIT

CROSS REFERENCE TO RELATED APPLICATION

This application claims priority to German Utility Model Application No. 20 2006 017 803.1, filed Nov. 22, 2006, which is hereby incorporated by reference in its entirety for all purposes.

BACKGROUND

The present disclosure relates to a sensor unit for the position determination of a powered door having a position sensor and a transmission stage for the connection of the position sensor to the drive shaft of the door.

Such sensor units, which improve the control of the door drive, are usually integrated in the door drive or attached to the transmission. However, this requires a complex and expensive construction of the corresponding drives, whereas sensor-free drives are substantially more favorable. Moreover, a number of old systems are equipped with sensor-free drives which have to be replaced completely in order to renew control of the door drive in known solutions.

It is therefore the object of the present disclosure to provide a sensor unit which can be used flexibly and can thus also be integrated in existing systems.

SUMMARY

This object is solved in accordance with the present disclosure by a sensor unit for the position determination of a powered door, having a position sensor and a transmission stage for the connection of the position sensor to the drive shaft of the door. In this context, the sensor unit in accordance with the present disclosure has a separate housing so that it can be installed independently of the drive unit of the door. The sensor unit is thus mechanically separate from the drive unit of the door and can be positioned at any position of the door and can be connected there to the drive shaft of the door.

In conjunction with the sensor unit in accordance with the present disclosure, sensor-free drives can thus be used which only comprise the motor and the transmission so that cost-favorable standard solutions can in particular also be made use of in special designs. Existing old systems can also be retrofitted with the sensor unit and a modern control that is current with the state of the art without having to replace the drive unit. The sensor unit can thus be retrofitted easily in existing door systems, in that it is arranged at the drive shaft of the door between the drive unit and the door.

Moreover, this can be of advantage with tight space conditions since the sensor can be installed independently of the geared motor. A more flexible arrangement is thus possible with a better utilization of space. Special drives can also be made sensor-free since the sensor unit can be attached to any desired position on the door shaft.

The sensor unit in accordance with the present disclosure can be used with any desired powered door. If, for example, the door is moved via a traction cable or a traction chain, the sensor unit in accordance with the present disclosure can be installed on the door shaft between the door cable drum and the drive unit of the shaft. In other doors, the sensor unit can be installed correspondingly at any desired position on the drive shaft.

The housing of the sensor unit in accordance with the present disclosure advantageously has a cut-out through which the drive shaft can run. This permits a space-saving and stable construction of the sensor unit in accordance with the present disclosure as well as a simple installation on the drive shaft of the door, also in particular in the retrofitting of existing systems.

Further advantageously, the transmission stage of the sensor unit in accordance with the present disclosure has a worm gear. Such a worm gear is a simple and space-saving possibility of converting the revolutions of the drive shaft of the door into a reduced number of revolutions of the position sensor and thus of adapting the travel path of the door to the travel path of the position sensor.

The worm shaft of the worm gear is advantageously made hollow so that it can be installed on the drive shaft of the door. This permits a space-saving and stable construction of the sensor unit in accordance with the present disclosure as well as a simple installation, also in particular in the retrofitting of existing systems. The worm hollow wheel is advantageously pushed onto the drive shaft in this connection and possibly secured against rotation by securing members such as a tongue and groove arrangement.

Further advantageously, the position sensor in accordance with the present disclosure is a reference point system, in particular a multi-reference point system. A reference point disk may be used in this connection whose rotation is coupled to the rotation of the drive shaft via the transmission stage. Reference points are arranged on the reference point disk, which are recognized by the sensors when the disk moves past them. The position of the disk and thus the travel path of the door can be determined via these reference points. The position sensor can thus recognize at least one end position and one start position of the door. Further advantageously, the position sensor includes even further reference points so that the control of the drive receives more accurate information on the position of the door leaf.

The gear stage is advantageously designed in this connection such that it converts the revolutions of the drive shaft corresponding to the maximum travel path of the door into the maximally possible revolutions of the position sensor. In this connection, a maximum of one revolution is usually possible with the position sensor so that the revolutions of the drive shaft corresponding to the maximum travel path of the door can be converted into at most one revolution of the position sensor.

Further advantageously, the sensor unit in accordance with the present disclosure includes an apparatus for the detection of the speed of the drive shaft, in particular a pulse disk. Such a pulse disk, which is equally coupled to the rotation of the drive shaft, generates pulses in this connection in conjunction with a corresponding sensor on a movement of the drive shaft which can be used to detect the speed. Regular cut-outs can for example be provided for this purpose at the edge of the pulse disk, said cut-outs generating pulses together with a light barrier on a rotation of the drive shaft, and said pulses thus corresponding to a rotation around a certain angular range. The pulse disk can be arranged at any desired position within the sensor unit in this connection and can optionally be connected to the drive shaft via a transmission stage.

The pulse disk advantageously has an opening, however, with which it can be installed around the drive shaft. The pulse disk, just like the worm shaft in accordance with the present disclosure, can be installed at the drive shaft in a space-saving manner.

Further advantageously, in this connection, the pulse disk is attached to the worm shaft. The unit of worm shaft and pulse disk can thus simply be pushed onto the drive shaft of the door.

In accordance with one embodiment of the present disclosure, the position sensor can also be designed without a multi-reference point system. Only a pulse disk 13 is used as a pulsing device (incremental disk) here.

Further advantageously, the position sensor in accordance with the present disclosure has a reference disk whose axis of rotation extends parallel to the drive shaft. A particular space saving and flat design of the sensor unit is made possible by such an arrangement in which the axes of rotation of the drive shaft and the reference point disk are parallel to one another. The sensor unit can thus have a very slim construction along the drive shaft, whereas it is made somewhat larger perpendicular to the drive shaft due to the size of the reference point disk. This corresponds in a particularly favorable manner to the usual installation conditions in which only a little space is available between the drive unit and the door along the drive shaft. The drive of the reference point disk advantageously may take the place of the worm gear as well as a further gear.

The transmission stage of the sensor unit in accordance with the present disclosure advantageously has a bevel gear stage for the drive of the position sensor. In particular, it is possible via such a bevel gear stage to align the axes of rotation of the position sensor and the drive shaft in accordance with the construction requirements. It is thus possible to align the axes of rotation in parallel with the worm gear without a transmission stage having a large design.

Further advantageously, the transmission stage in accordance with the present disclosure has a worm gear, a spur gear intermediate stage and a bevel gear stage. The gear reduction of the transmission stage can thus be set for example, via the spur gear intermediate stage and can be adapted to the travel path of the door, whereas the worm gear and the bevel gear stage can be made identical in form.

The present disclosure furthermore includes a combination of a sensor unit as described above with an electronic control system which evaluates data from the sensor unit and controls the drive unit of the door. Such a combination of sensor unit and electronic control system can thus be integrated in existing drive trains to equip existing old systems with a modern control and to bring them in line with the current state of the art.

The present disclosure furthermore includes a door drive train having a drive unit, a drive shaft as well as a sensor unit as described above, with the sensor unit being installed separately from the drive unit. The same advantages in accordance with the present disclosure thus result as described above.

Further advantageously, in this connection, the sensor unit is attached to the drive shaft. The sensor unit is in particular advantageously pushed over the drive shaft with the worm shaft.

The drive unit is itself advantageously made sensor-free in the door drive train in accordance with the present disclosure. It is thus possible to make use of cost-effective standard solutions for the drive unit. This can also be of advantage particularly in tight space conditions.

Further advantageously, the door drive train in accordance with the present disclosure includes an electronic control system which evaluates data from the sensor unit and controls the drive unit. Such an electronic control system can also be retrofitted to equip an existing door drive train with a modern electronic control system.

Further advantageously, the door drive train in accordance with the present disclosure may include two or more drive units. It is thus possible to make use of cost-effective smaller drive units, which can moreover be of advantage with tight space conditions. Moreover, a single sensor unit in accordance with the present disclosure may be used with a plurality of drive units, which again saves costs.

A drive unit is advantageously attached to both sides of the door in each case. Thus, a symmetrical drive of the door can be realized.

The present disclosure furthermore includes a powered door having a sensor unit or a door drive train as described above. Such a door obviously has the same advantages as the corresponding sensor units or door drive trains.

BRIEF DESCRIPTION OF THE FIGURES

The present disclosure will now be described in more detail with reference to the embodiments and drawings.

DETAILED DESCRIPTION OF THE FIGURES

Figure 1:
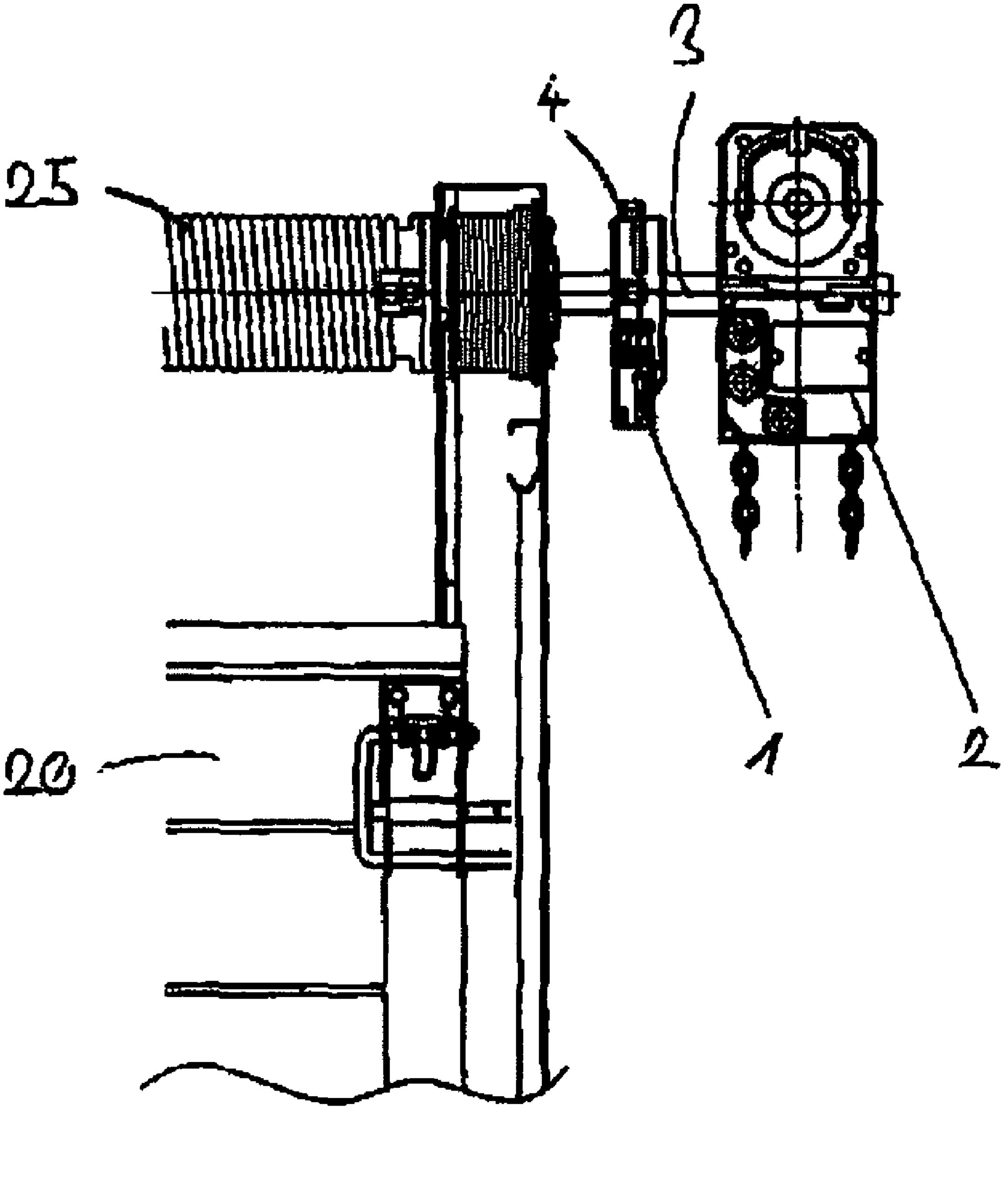
FIG. 1 shows an embodiment of the drive train in accordance with the present disclosure.

FIG. 1 shows an embodiment of the drive train in accordance with the present disclosure comprising the sensor unit 1 in accordance with the present disclosure, the drive unit 2 and the drive shaft 3. The sensor unit 1 in accordance with the present disclosure has its own housing 4 and can thus be installed on the door shaft 3 of the door 20 independently of the drive unit 2. In FIG. 1, the sensor unit 1 is positioned between the drive unit 2 and the door cable drum 25. The housing 4 of the sensor unit 1 has a cut-out through which the drive shaft 3 passes. In the sensor unit 1, the revolutions of the drive shaft 3 of the door 20 are converted via the transmission stage of the sensor unit into revolutions of the position sensor which can thus determine the position of the door.

The drive unit 2 which drives the drive shaft 3 may be any desired shaft drive which usually comprises an electric motor and a transmission stage. Due to the sensor unit 1 being installed separately from the drive unit 2, the use of sensors integrated into the drive unit can be dispensed with in this connection. It is thus possible to integrate the sensor unit in accordance with the present disclosure as a module into a door drive train.

Figure 2:
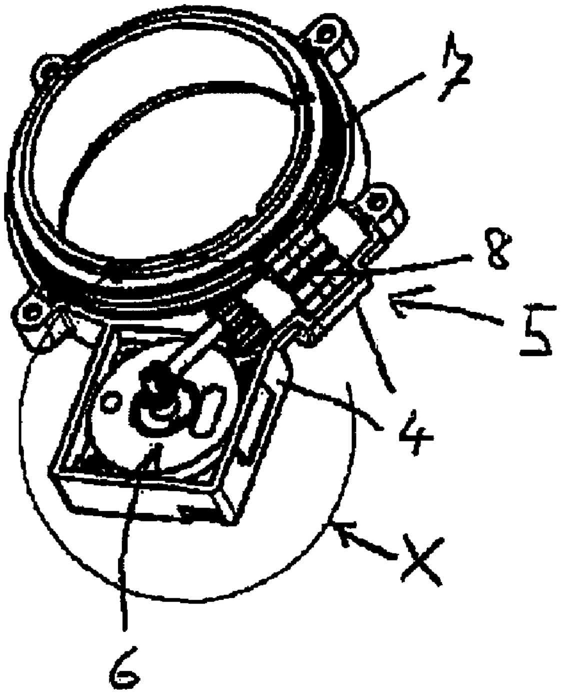
FIG. 2 shows a perspective drawing of a first embodiment of the sensor unit in accordance with the present disclosure.
Figure 2:
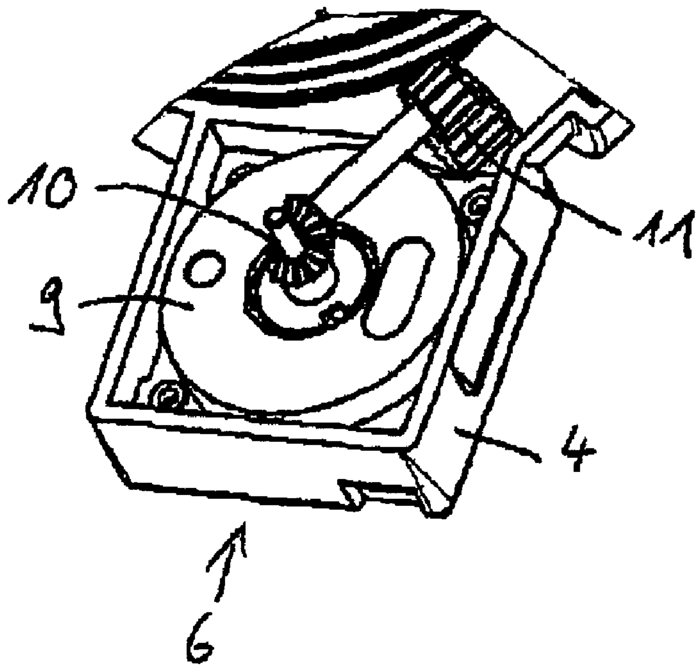
Figure 3:
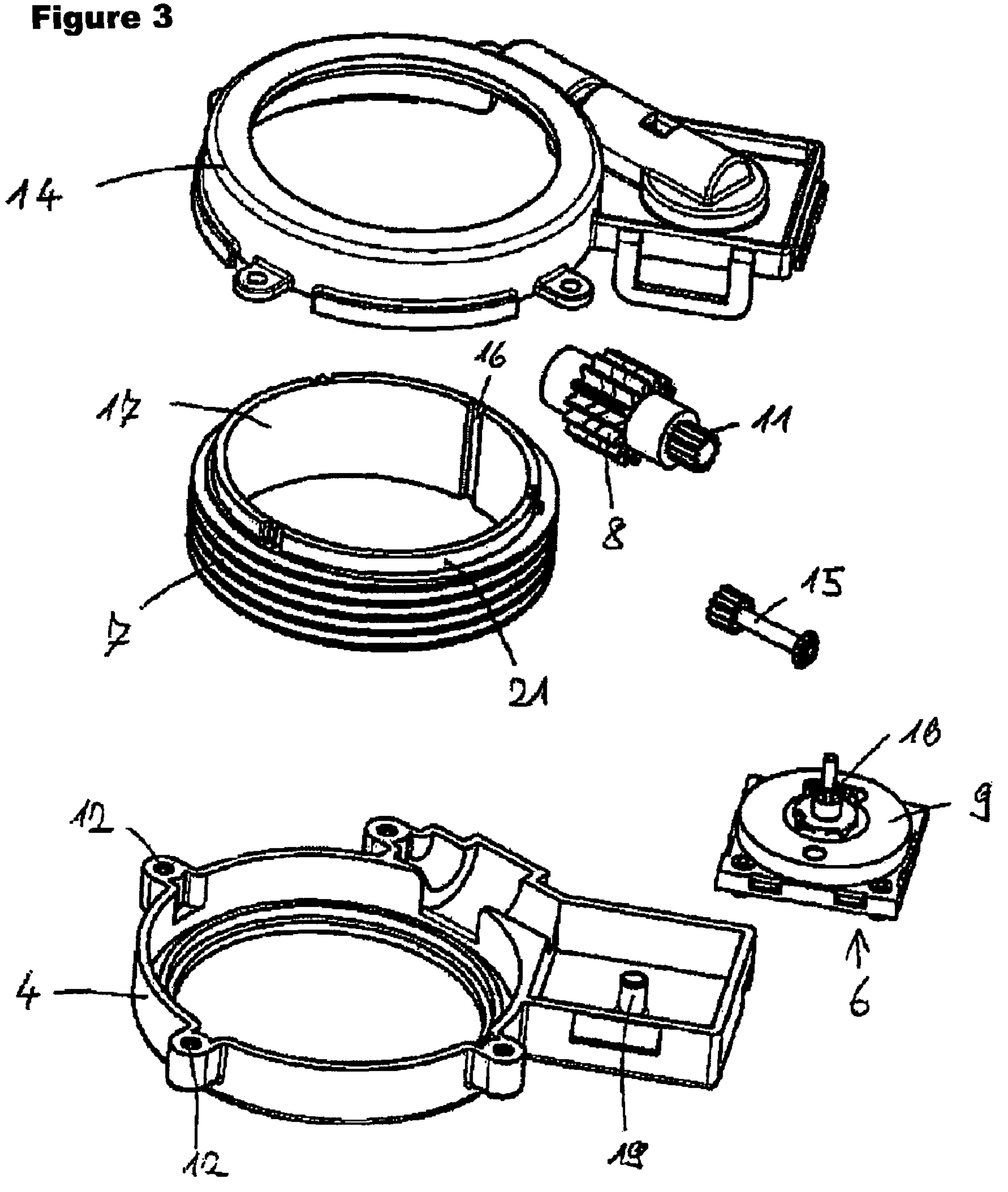
FIG. 3 shows an exploded drawing of the first embodiment of the sensor unit in accordance with the present disclosure.

FIG. 2 now shows a first embodiment of the sensor unit 1 in accordance with the present disclosure which is shown again in FIG. 3 in an exploded drawing.

The position sensor 6 in this context is a multi-reference point system which in particular includes the reference disk 9. Reference points are located on this reference disk 9 which are recognized by sensors and so permit a determination of the position of the door via the determination of the position of the reference point disk.

A transmission stage is provided for the purpose of the transmission of the rotation from the drive shaft to the sensor unit 6. For this purpose, the inner surface 17 of a worm shaft 7, which is made as a hollow shaft, is pushed onto the drive shaft 3 and secured against rotation via the groove 16 and a corresponding counter element on the drive shaft 3. The worm shaft 7 thus translates the rotation of the drive shaft 3 into a rotation of the pinion 8 which is in engagement with the worm shaft 7 and forms the worm gear of the sensor unit in accordance with the present disclosure with it. The transmission stage furthermore includes an intermediate member 15 which has a spur gear on the one side and a bevel gear on the other side. The spur gear of the intermediate member 15 is, in this process, in engagement with a spur gear 11 arranged on the same axis as the pinion 8. The bevel gear of the intermediate member 15 is in turn in engagement with a bevel gear 10 installed on the rotary axle of the position sensor 6. The transmission stage thus couples the rotation of the reference point disk 9 to the rotation of the drive shaft 3.

In this connection, the sensor unit is accommodated in its own housing which comprises a lower housing side 4 and an upper housing side 14. These two housing halves are connected to one another via screw connections 12 and thus surround the sensor unit. The housing also has a substantially circular cut-out through which the drive shaft of the door can pass. The sensor unit in accordance with the present disclosure can thus simply be installed around the drive shaft, which permits a particularly space-saving installation, as is shown in FIG. 1.

In this connection, the very flat construction of the sensor unit in accordance with the present disclosure is also of advantage which is permitted by the parallel axes of rotation of the position sensor and of the drive shaft. In this connection, the worm shaft 7 is connected to the reference point disk 9 via the transmission stage, and indeed by the pinion 8 as well as by the connection member 15 whose axis of rotation extends in a plane perpendicular to the axis of rotation of the position sensor 6 and the worm shaft 7. The pinion 8 and the connection member 15 are each supported in corresponding bearings of the housing 4 and 14 respectively. The axis of the position sensor 6 is also arranged on a bearing 19 of the housing 4.

The housing hereby substantially comprises three regions in communication with one another, with a first region being substantially annular and surrounding the gear shaft 7 or the drive shaft of the door, a middle region being arranged substantially tangentially to the worm shaft 7 or the drive shaft of the door and receiving the transmission gear, i.e. the pinion 8 and the connection member 15, and a third region being arranged to the side and receiving the position sensor. The position sensor can thus be accommodated in a separate section of the housing 4 or 14 in addition to the drive shaft 3 and can moreover stand perpendicular on the drive shaft in its largest extent along the plane of the reference point disk 9.

Figure 4:
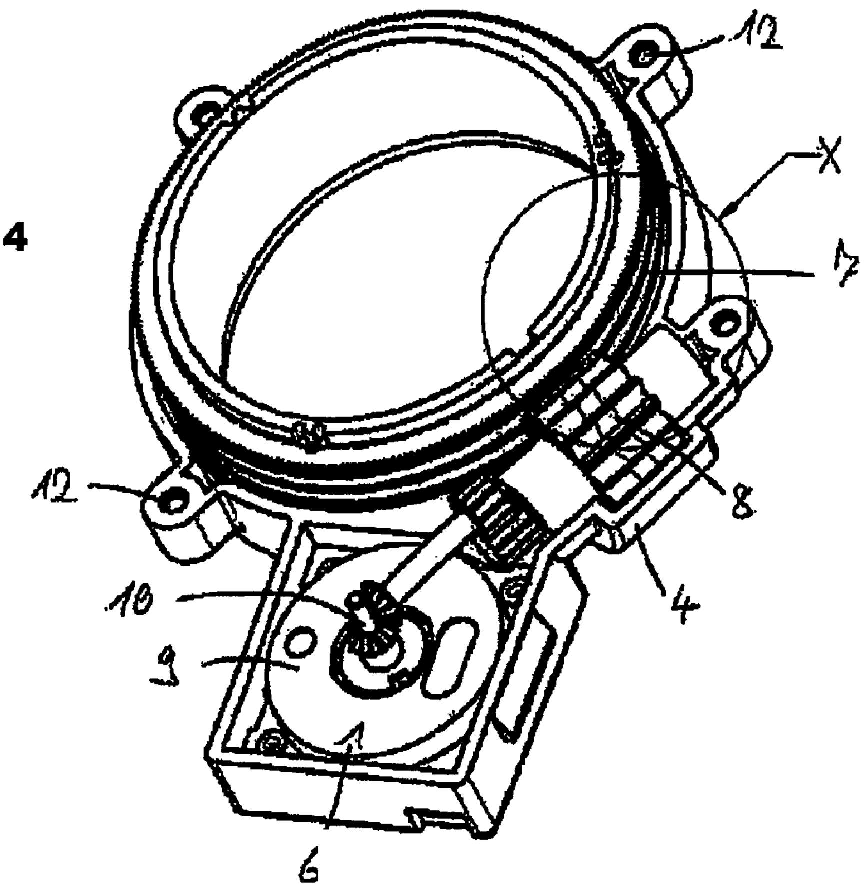
FIG. 4 shows a second embodiment of the sensor unit in accordance with the present disclosure.
Figure 4:
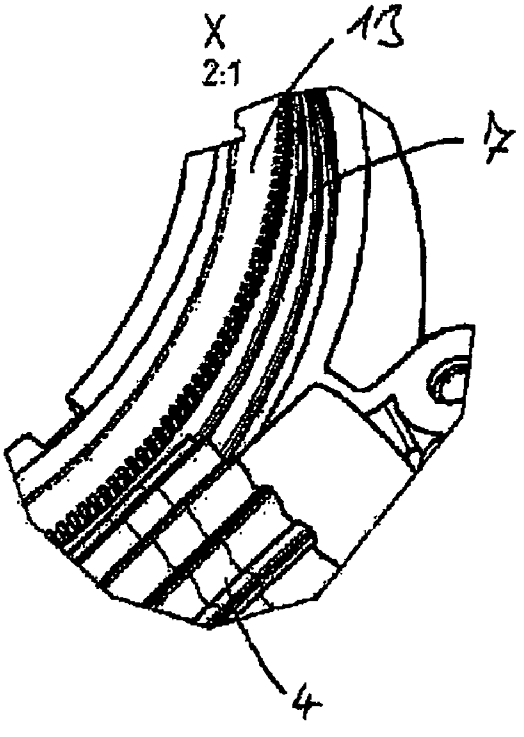
Figure 5:
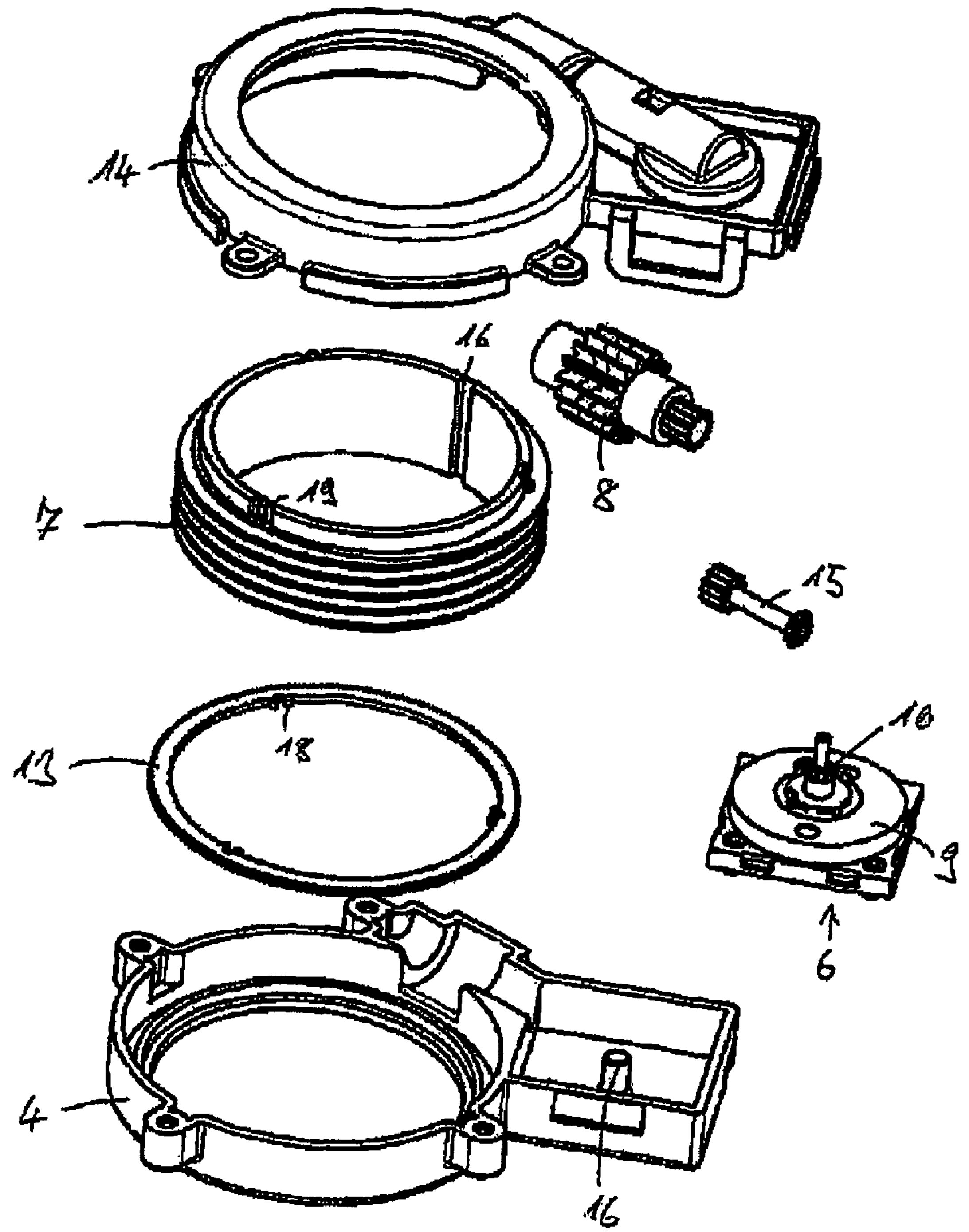
FIG. 5 shows an exploded drawing of the second embodiment of the sensor unit in accordance with the present disclosure.

A second embodiment of the sensor unit in accordance with the present disclosure, which likewise includes all the previously described members of the first embodiment, is shown in FIGS. 4 and 5. The second embodiment moreover has a pulse disk 13, however, with which the speed of the drive shaft and thus the travel speed of the door can be determined. For this purpose, it likewise has a cut-out which substantially corresponds to the size of the drive shaft of the door and with which it can be pushed onto a cylindrical region 21 of the worm shaft 7. The pulse disk 13 is fastened to corresponding receiving members 19 on the worm shaft 7 in this process via fastening elements 18. This unit of worm shaft 7 and an impulse disk 13 installed thereon can, as in the first embodiment, simply be installed on the drive shaft of the door so that the position sensor 6 driven via the transmission gear determines the position of the door, whereas the speed of the door can also be determined via the pulse disk 13. For this purpose, the pulse disk 13 has cut-outs which are arranged at regular intervals along its rim and which generate pulses which correspond to a certain pivot angle of the drive shaft via a light barrier arranged at the housing 4 or 14 on a rotation of the drive shaft.

The sensor unit 1 in accordance with the present disclosure can thus easily be retrofitted in already existing door systems by the arrangement in its own housing 4 and 14 in that it is installed on the drive shaft. Existing old systems can thus be brought into line with the state of the art via the sensor unit and a modern control. It is equally possible to use cost-effective sensor-free drives together with the sensor unit in accordance with the present disclosure. It can also be of advantage with tight space conditions to install the sensor unit separately from the drive unit 2. In addition, two motors can thus be used which are installed at both sides of the door without unnecessarily doubling the sensor unit.

The invention claimed is:

1. A sensor unit to determine a position of a powered door, comprising:

a position sensor;

a drive shaft;

a transmission stage to connect the position sensor to the drive shaft; and a housing configured to enable installation of the sensor unit independent of a drive unit of the door.

2. The sensor unit in accordance with claim 1, wherein the housing forms a cut-out adapted to receive the drive shaft.

3. The sensor unit in accordance with claim 1, wherein the transmission stage has a worm gear including a worm shaft.

4. The sensor unit in accordance with claim 3, wherein the worm shaft forms an opening adapted to receive the drive shaft.

5. The sensor unit in accordance with claim 1, wherein the position sensor is a reference point system.

6. The sensor unit in accordance with claim 5, wherein the reference point system is a multi-reference point system.

7. The sensor unit in accordance with claim 1, wherein the transmission stage is configured to convert revolutions of the drive shaft corresponding to a maximum travel path of the door into maximum possible revolutions of the position sensor.

8. The sensor unit in accordance with claim 1, further comprising:

an apparatus to detect a speed of the drive shaft.

9. The sensor unit in accordance with claim 8, wherein the apparatus is a pulse disk.

10. The sensor unit in accordance with claim 9, wherein the pulse disk forms an opening adapted to receive the drive shaft.

11. The sensor unit in accordance with claims 8, wherein the pulse disk is attached to the worm shaft.

12. The sensor unit in accordance with claim 8, wherein the position sensor is a pulsing device.

13. The sensor unit in accordance with claim 1, wherein the position sensor includes a reference point disk, wherein an axis of rotation of the point disk extends parallel to the drive shaft.

14. The sensor unit in accordance with claim 1, wherein the transmission stage includes a bevel gear stage to drive the position sensor.

15. The sensor unit in accordance with claim 1, wherein the transmission stage includes a worm gear, a spur gear intermediate stage and a bevel gear stage.

16. The sensor unit in accordance with claim 1, further comprising:

an electronic control system configured to evaluate data from the sensor unit and control the drive unit of the door.

17. The sensor unit in accordance with claim 1, wherein the transmission stage converts one revolution of the drive shaft into one revolution of the position sensor to thereby determine the position of the door.

18. A door drive train, comprising:

a drive unit;

a drive shaft; and an independent sensor unit including:

a position sensor; and a transmission stage connecting the position sensor to the drive shaft to cause one revolution of the drive shaft to correspond to one revolution of the position sensor and align an axis of rotation of the position sensor with an axis of rotation of the drive shaft drive such that the axes of rotation are parallel, wherein the sensor unit is configured to be mounted to a door separately from the drive unit.

19. The door drive train in accordance with claim 18, wherein the sensor unit is attached to the drive shaft.

20. The door drive train in accordance with claim 18, wherein the drive unit does not include a sensor.

21. The door drive train in accordance with claim 18, further comprising:

an electronic control system which evaluates data from the sensor unit and controls the drive unit.

22. The door drive train in accordance with claim 18, further comprising:

at least a second drive unit.

23. The door drive train in accordance with claim 20, wherein a respective drive unit is attached to each side of a door of the door drive train.

24. A retrofit sensor unit to determine a position of a powered door, the sensor unit mechanically separate from a drive unit of the powered door, the sensor unit comprising:

a position sensor including a reference point disk, the position sensor configured to recognize at least one end position and one start position of the powered door based on a position of the reference point disk;

a transmission stage to connect the position sensor to a drive shaft of the powered door, the transmission stage including a hollow worm gear, the hollow worm gear forming an opening adapted to receive the drive shaft, wherein gear reduction of the hollow worm gear causes one revolution of the drive shaft to correspond to one revolution of the reference point disk, and the transmission stage including a bevel gear stage to align an axis of rotation of the position sensor with an axis of rotation of the drive shaft drive such that the axes of rotation are parallel;

a housing configured to mount to the powered door independent of the drive unit, the housing forming a cut-out adapted to receive the drive shaft; and a control system to evaluate positional data from the position sensor and adjusting the position of the powered door based on the positional data.

* * * * *